(12) United States Patent
Katagiri et al.

(10) Patent No.: US 6,402,416 B1
(45) Date of Patent: Jun. 11, 2002

(54) WATERPROOF STRUCTURE OF CONNECTING PORTION

(75) Inventors: Moriya Katagiri, Tokyo; Naoki Fujikawa, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/487,166

(22) Filed: Jan. 19, 2000

(30) Foreign Application Priority Data

Jan. 28, 1999 (JP) ............................................. 11-020121

(51) Int. Cl.⁷ ................................................. B25G 3/28
(52) U.S. Cl. ........................ 403/282; 403/274; 403/230; 403/367; 396/29; 348/81
(58) Field of Search .................. 396/25, 29; 348/81; 277/637, 630, 644, 648, 925; 403/274, 279, 282, 230, 231, 367

(56) References Cited

U.S. PATENT DOCUMENTS 5,512,969 A * 4/1996 Harris .......................... 396/25
5,610,655 A * 3/1997 Wakabayashi et al. ......... 348/81
5,689,735 A * 11/1997 Horning et al. ................ 396/29
5,832,312 A * 11/1998 Rieger et al. .................. 396/25
5,897,225 A * 4/1999 Rieger et al. .................. 396/29

FOREIGN PATENT DOCUMENTS

JP      63-173232      11/1988
JP      04-9931      1/1992

* cited by examiner

Primary Examiner—Lynne H. Browne
Assistant Examiner—Aaron Dunwoody
(74) Attorney, Agent, or Firm—Frishauf, Holtz, Goodman, Langer & Chick, P.C.

(57) ABSTRACT

A waterproof structure includes a first member (front cover) having an elastically-deformable projection at one end and a second member (rear cover) having a contact surface capable of contacting outer and inner surfaces of the projection. When the first and second members are coupled to each other, the projection is depressed on the contact surface and deformed elastically. A contact portion of the projection and the contact surface forms a waterproof region to render a coupling portion of the first and second covers waterproof. Thus, no waterproof elastic member (packing) is required and accordingly no assembly step thereof is required.

27 Claims, 2 Drawing Sheets

WATERPROOF STRUCTURE OF CONNECTING PORTION

BACKGROUND OF THE INVENTION

The present invention relates to a connection of a plurality of members and, more particularly, to a waterproof structure of a connecting portion.

Recently waterproof portable goods used in daily life have tended to increase in number. For example, cameras are used outdoors with relatively high frequency, and thus it is important that they should have a so-called waterproof (splash-proof) function in order that they can be used in places such as a beach and a ski slope or under conditions of bad weather such as a rainy or snowy day.

A conventional waterproof structure for cameras is disclosed in, for example, Jpn. U.M. Appln. KOKAI Publications Nos. 63-173232 and 4-9931. These publications are directed to the techniques shown in FIGS. 6 and 7, respectively. In order to render a camera waterproof, a waterproof structure in which a packing (elastic member) 16 of a loop-shaped seal member is inserted between covers 14 and 15 of a camera body, is adopted.

In the foregoing waterproof structure, a groove is formed in a coupling portion of one of the covers 14 and 15, e.g., the cover 15, and a projection 17 is formed in that of the other cover 14 to be fitted into the groove. The packing 16, which is held in advance in the groove, is pressed by the projection 17, the bottom 18 of the groove and the wall surface 19 thereof, and both the covers 14 and 15 are coupled and brought into intimate contact with each other, thereby fulfilling a waterproof function sufficiently.

In the above-described prior art waterproof structure of a camera body, however, a waterproof elastic member such as a rubber and an O-shaped ring is inserted and pressed between front and rear covers which are mounted as exterior members of the camera body to waterproof the camera body. The material costs for the waterproof packing as an elastic member used for the waterproof is always needed. In assembling such a waterproof camera, an elastic member is inserted in a groove formed along the outer circumference of the camera cover (exterior member) and opposite to the projection of the cover, and then the cover with the projection is attached and coupled to the other cover. Consequently, it takes a long time to perform an operation of inserting the elastic member in the groove formed in the cover, and the operability of the assemblage is deteriorated.

The object of the present invention is to provide a waterproof structure of a coupling portion in which at least two covers constituting a camera body are simply coupled to each other without using any waterproof members, thereby producing a waterproof effect of the camera body.

BRIEF SUMMARY OF THE INVENTION

The present invention has been developed in consideration of the above situation and takes the following measures in order to resolve the problems of the prior art and attain the above object.

According to an aspect of the present invention, there is provided a waterproof structure of a connecting portion, comprising a first member having an elastically-deformable projection at one end and a second member having a contact surface contacting an outer surface and an inner surface of the projection, wherein the projection is pressed on the contact surface of the second member and deformed elastically when the first member and the second member are coupled to each other, and the contact surface and the projection are brought into contact with each other to form a waterproof region.

The projection is shaped like a hook and brought into contact with the contact surface to make the connecting portion waterproof (to prevent water from passing through the connecting portion).

The contact surface of the second member is formed such that when the first member and the second member are coupled to each other, a base of the projection is prevented from contacting the contact surface and an end portion thereof contacts the contact surface. The connecting portion of the second member is thus formed widely.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The subject matter of the present invention is as follows. At least two cover members are coupled to each other to form a box-like structure for a body capable of receiving an object to be waterproofed. At the coupling portion of the cover members, one of the cover members has a contact surface and the other has a projection which is characterized in shape, and the projection is brought into contact with the contact surface. Only the coupling of the cover members therefore allows the body to be waterproofed sufficiently without using any waterproof elastic member (e.g., a rubber and an O-shaped ring).

A plurality of embodiments of a camera having the above subject matter will now be described in detail.

First Embodiment

Figure 1:
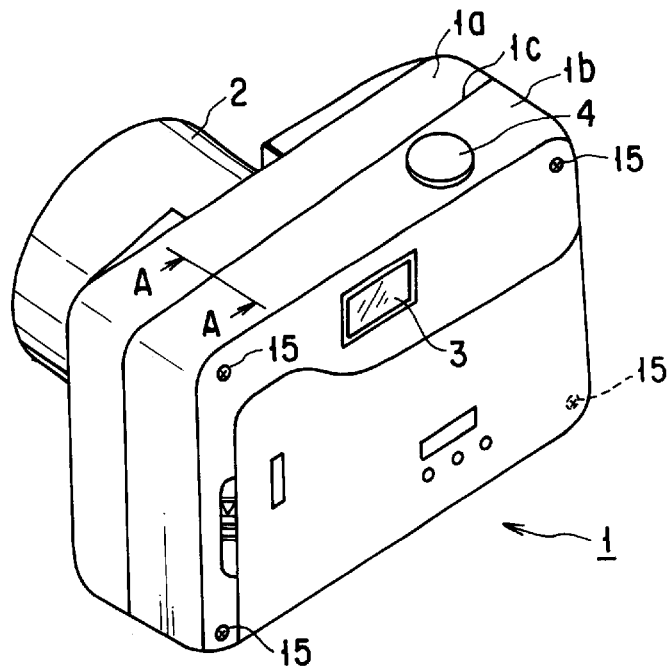
FIG. 1 is a perspective view showing an outward appearance of a camera having a structure according to a first embodiment of the present invention.

FIG. 1 shows an outward appearance of a camera having a waterproof structure according to the present invention. Like commonly-used cameras, the camera of the present invention is a simple one in which a lens barrel 2 is projected from the front of a camera body 1 to form an exterior member (an outer fence) of an optical system. The body 1 is made of thin metal or resin and includes a front cover 1a and a rear cover 1b. The front cover 1a is provided with the lens barrel 2 and the rear cover 1b is mounted with a finder 3 and a shutter 4. The front and rear covers 1a and 1b are brought into intimate contact with each other along a coupling portion 1c therebetween and formed integrally as one component. The front and rear covers 1a and 1b are fixed to each other by at least four screws 15 from the rear covers 1b after they are assembled as will be described later.

The internal room protected by the front and rear covers 1a and 1b stores major optical systems, various mechanisms and electric circuits of the camera.

Figure 2:
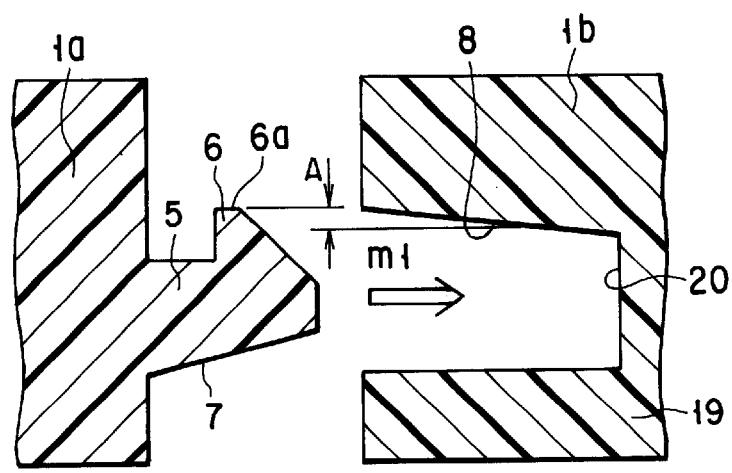
FIG. 2 is an enlarged cross-sectional view taken along line A—A of FIG. 1 and showing front and rear covers having a groove and a projection which are to be fitted to each other.

FIG. 2 is an enlarged cross-sectional view taken along line A—A of FIG. 1 and showing the coupling portion (1c in FIG. 1) of the front and rear covers 1a and 1b, especially in which the front and rear covers 1a and 1b are separated from each other, or the front cover 1a is not moved in the direction of arrow m1 or coupled to the second cover 1b.

The rear cover 1b has a groove whose opening is slightly broader, and a hook-shaped projection 5, whose size is almost equal to that of the groove of the rear cover 1b, is formed on the front cover 1a. A small projection 6 is projected upwardly from one end of the projection 5, and a small-projection end portion 6a is provided at one end of the small projection 6 so as to contact the wall surface of the groove of the rear cover 1b.

The end portion of the small projection 6, which faces the opening of the rear cover 1b, has an inclined side to be shaped like a wedge. The head of the end portion is flattened in a direction which is almost perpendicular to the assembly direction. As shown in FIG. 2, the underside of the small projection 6 is an inclined surface 7. The section of the entire projection 5 is almost trapezoidal as shown in FIG. 2. Therefore, the projection 5 is so shaped that it is inclined from the its distal end portion toward its proximal end portion. This shape produces an effect that the projection 5 can easily be inserted into the groove.

The small projection 6 of the front cover 1a having a characteristic cross-section forms a so-called interference (a difference in dimension between the groove and projection when the dimension of the groove is smaller than that of the projection)-A wrapped with the projection 5 and the upper wall surface of the groove and deforms the projection 5 elastically. When the front and rear covers 1a and 1b are coupled to each other, the small-projection end portion 6a contacts the upper wall surface of the groove. A predetermined space can thus be created behind the projection 5 such that the projection 5 can be deformed elastically by the interference-A.

In order that the projection 5 can easily be inserted into the groove of the rear cover 1b toward the direction of arrow m1, the groove has an inclined surface 8 on one side and its opening is slightly broader.

A position determining portion for determining a relative position which is almost perpendicular to the direction (arrow m1 in FIG. 2) in which both the front and rear covers 1a and 1b are coupled to each other, corresponds to the base of the projection 5 (a lower corner, i.e., an end portion of the inclined surface 7). If, as shown in FIG. 3, the projection (5, 6) is brought into contact with the groove (upper and lower walls thereof), the covers are correctly positioned by the base of the projection, which is opposed to the contact, and its adjacent wall surface of the groove.

Figure 3:
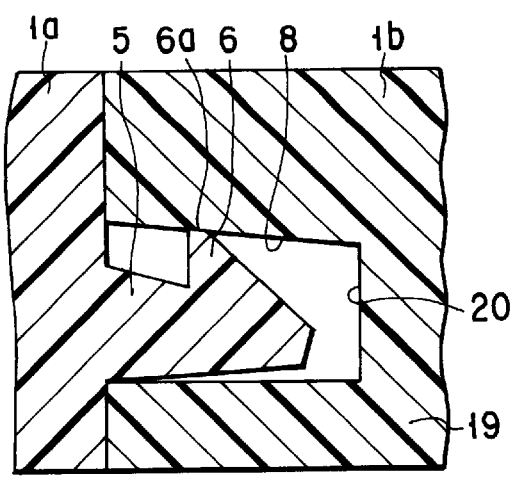
FIG. 3 is an enlarged cross-sectional view showing the front and rear covers which are coupled to each other.

If the front cover 1a so shaped is moved further in the direction of arrow m1, it is coupled firmly to the rear cover 1b as shown in the enlarged sectional view of FIG. 3. More specifically, if the front and rear covers 1a and 1b are coupled integrally as one component, the inclined surface 8 of the groove, which is opposed to the small projection 6 of the projection 5, is brought into intimate contact with the small-projection end portion 6a, and the portion 6a is slightly deformed elastically by given pressure from the inclined surface 8. Since, a space, which is larger than an "interference," is formed behind the small-projection end portion 6a, the projection 5 is deformed elastically and distorted in the direction of the space. Since, moreover, the projection 5 is provided with the inclined surface and decreased in width toward its end portion and the groove is increased in width toward its opening, both the covers can easily be coupled to each other. In other words, the inclined surface of the projection 5 and that of the groove each serve as a guide portion for coupling the two covers.

Since the small projection 6 of the projection 5 of the front cover 1a and the inclined surface 8 of the rear cover 1b contact each other, there is no gap between the two covers, and the inside of the covers can be made waterproof. More specifically, both the covers can reliably be coupled to each other and a given waterproof can be achieved by friction produced on the contact portion (small-projection end portion 6a) of the projection 5, with the result that the flow of fluid (water, air, etc.) between the inside and outside of the covers is cut off by the contact portion as a boundary.

The space created behind the contact portion (small-projection end portion 6a) of the projection 5 is hermetically sealed with the contact portion 6a when both the covers 1a and 1b are coupled to each other. Conversely, when the two covers 1a and 1b are separated from each other, the space provides a so-called clearance (a space which is movable when the covers are coupled) to prevent trouble that the covers tightly contact each other and thus cannot be separated easily from each other. Conventionally, such trouble has occurred frequently.

According to the first embodiment described above, a conventionally-used packing member, such as a rubber and an O-shaped ring, need not be mounted if the front and rear covers 1a and 1b have only to be coupled to each other. A step of mounting such a packing member is deleted; therefore, the assembly operability of a camera is improved and the materials cost of a packing member becomes unnecessary.

The foregoing waterproof structure has a waterproof property which is equal to or higher than that of the prior art structure. The covers of the waterproof structure can reliably and easily be coupled to and separated from each other. A camera body with such a waterproof structure can be manufactured simply and inexpensively.

Modification 1

The small-projection end portion 6a of the small projection 6 of the projection 5 of the front cover 1a, which is deformed elastically by the inclined surface 8 of the groove of the rear cover 1b and brought into intimate contact therewith, can be rounded off to such an extent that it does not slip.

In the above first embodiment, the waterproof structure is mainly directed to a "water-resistant" function used in daily life. However, the waterproof structure can be doubled or the contact surface can be broadened to reinforce a hermetic structure (which prevents air from flowing) such that a camera can be soaked into water. If the rear cover 1b shown in FIGS. 2 and 3 has sufficient rigidity, both lower and bottom walls 19 and 20 of the groove of the rear cover 1b can be deleted.

Since, as shown in FIGS. 2 and 3, a space is formed between the projection (5, 6) and the groove, the projection has only to be distorted in a standard "water-resist" function. In the case of a camera under high water pressure, such as an underwater camera, an elastic member such as a rubber can be inserted into a space to enhance the waterproof effect.

Needless to say, a groove can be formed in the front cover 1a and a projection can be formed on the rear cover 1b and, in this case, too, the same effect as that of the first embodiment can be obtained.

Second Embodiment

Figure 4:
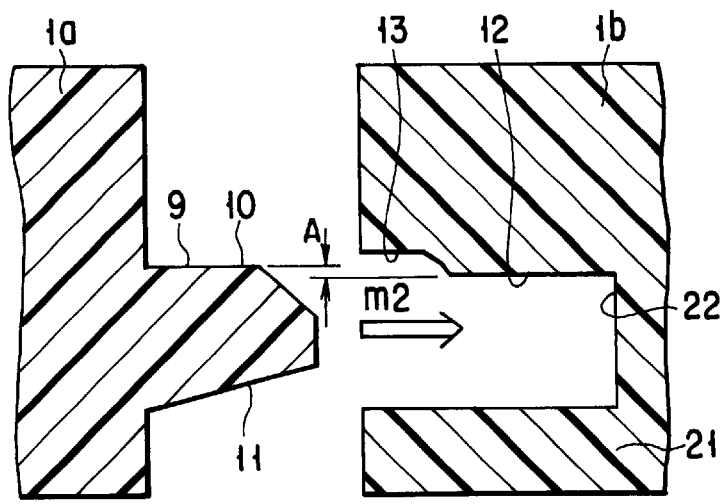
FIG. 4 is an enlarged cross-sectional view showing a camera having a structure according to a second embodiment of the present invention, in which its front and rear covers are to be coupled to each other.
Figure 5:
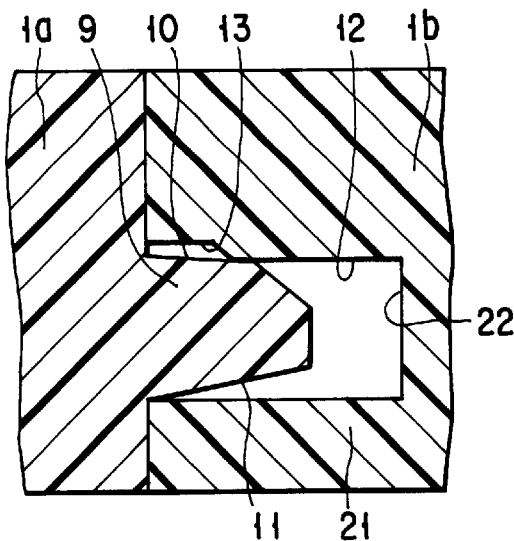
FIG. 5 is an enlarged cross-sectional view showing the front and rear covers which are coupled to each other.
Figure 6:
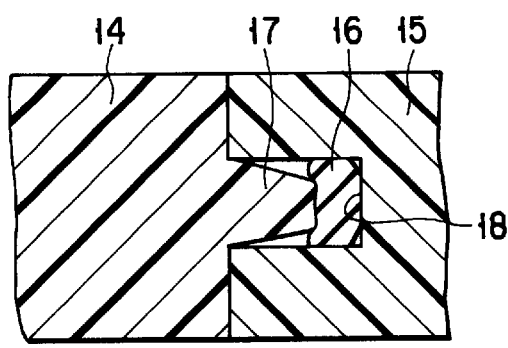
FIG. 6 is an enlarged cross-sectional view showing a prior art waterproof structure of a camera, especially a coupling portion using a packing of an elastic member.
Figure 7:
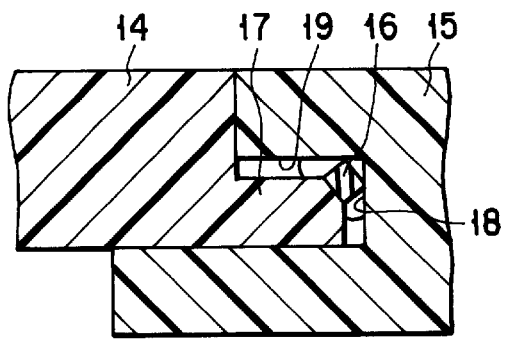
FIG. 7 is an enlarged cross-sectional view showing another prior art waterproof structure of a camera, that is, a coupling portion using a packing.

Referring to FIGS. 4 and 5, a waterproof structure according to a second embodiment of the present invention will now be described. The outward appearance of a camera adopting this structure is substantially the same as that of the camera of the first embodiment. The second embodiment is however featured in that a front cover 1a has a projection which is formed more simply.

According to the enlarged cross-sectional view of FIG. 4 corresponding to that of FIG. 2, a rear cover 1b has a characteristic concave groove (detailed later), and the front cover 1a has a projection 9 almost fitted into the groove of the rear cover 1b. In FIG. 4, the front cover 1a is about to move in the direction of arrow m2 and be coupled to the rear cover 1b. Specifically, a coupling portion (1c in FIG. 1) of these covers 1a and 1b is so constituted that a contact portion 10, which is provided at one end of the projection 9, has an interference A wrapped with one wall surface of the groove, and an inclined surface 11, which is inclined to create a space larger than the interference A, is provided on the underside of the projection 9. Unlike the projection 9 of the first embodiment, that of the second embodiment is formed in a relatively simple convex shape which is decreased in width toward its end portion.

A pressing surface 12 for wrapping (enclosing) the contact portion 10 and the interference and a slightly larger space surface 13 for creating a space above the projection 9 are formed in that portion of the groove of the rear cover 1b which faces the contact portion 10.

FIG. 5 is an enlarged cross-sectional view showing the front and rear covers 1a and 1b which are actually coupled to each other in the characteristic concave groove having the space surface 13. If, as shown, both the covers 1a and 1b are formed integrally as one component, the contact portion 10 of the projection 9 contacts its opposite pressing surface 12 of the wall surface of the groove and receives predetermined pressure from the pressing surface 12. Since, moreover, the space, which is larger than the interference, is formed behind the contact portion 10 (coupling portion 1c), the projection 9 is deformed elastically and distorted slightly in the coupling direction of the covers.

In the above situation, the contact portion 10 of the projection 9 of the front cover 1 and the pressing surface 12 of the wall surface of the groove of the rear cover 1b contact each other. Therefore, both the covers 1a and 1b are brought into intimate contact with each other, and the inside thereof can be sealed hermetically.

In the above-described waterproof structure of the second embodiment, the front and rear covers 1a and 1b can easily be coupled to each other by means of both the projection 9 decreasing in width toward its end portion and the space surface 13. In other words, they serve as a guide portion for coupling the two covers. When both the covers are coupled to each other, substantially the same advantage as that of the first embodiment can be obtained. Consequently, there can be provided a camera body 1 which reliably fulfills a waterproof function, improves in assembly operability since a waterproof packing member is unnecessary, and decreases in costs since no costs are required for the packing member.

Modification 2

The above-described waterproof structure is formed in a relatively simple shape. In order to adapt to variations in temperature and barometric pressure, the waterproof structure can be increased further in shield effect to fulfill a moisture-proof function (of preventing the entry of moisture) as well as a dripproof function (of preventing the entry of drips) for a long period of time.

The covers can be formed of another material or in another shape such that a connecting portion of the covers differs in elasticity modulus from another portion. If, as in the modification 1, the rear cover 1b shown in FIGS. 4 and 5 is rigid sufficiently, both lower and bottom walls 21 and 22 of the groove of the rear cover 1b can be omitted.

Since, furthermore, a space is formed between the projection 9 and the bottom wall 22 of the groove as illustrated in FIGS. 4 and 5, the projection has only to be distorted when a camera is of a standard "water-resist" type. In the case of a camera under high water pressure, such as an underwater camera, an elastic member such as a rubber can be inserted in the space in order to enhance the waterproof effect.

The waterproof structure of the present invention can widely be applied to the fields other than the camera described above. Various changes and modifications can be made without departing from the scope of the subject matter of the present invention.

Advantage of the Invention

According to the present invention described above, there can be provided a waterproof structure capable of sufficiently fulfilling a waterproof function if at least two covers constituting a body have only to be coupled to each other without using any waterproof elastic member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A waterproof structure of a connecting portion, comprising:
   a first member having an elastically-deformable projection at one end; and
   a second member having a contact surface contacting one of an outer surface and an inner surface of the projection,
   wherein the projection is pressed on the contact surface of the second member and deformed elastically so as to bend in a direction approximately perpendicular to a direction in which the first member and the second member are assembled when the first member and the second member are coupled to each other, and the contact surface and the projection are brought into contact with each other to form a waterproof region; and wherein the contact surface of the second member is formed such that when the first member and the second member are coupled to each other, a base of the projection is prevented from contacting the contact surface and an end portion thereof contacts the contact surface.

2. The waterproof structure according to claim 1, wherein the projection is shaped like a hook.

3. The waterproof structure according to claim 1, wherein a guide portion is formed at the end portion of the projection so as to be easily coupled to the second member.

4. The waterproof structure according to claim 3, wherein the guide portion includes one of an inclined surface and an arc.

5. The waterproof structure according to claim 1, wherein the waterproof structure is applied to a camera.

6. A waterproof structure of a camera, comprising:
a first camera body having an elastically-deformable projection at one end, the projection being formed integrally with the first camera body as a unitary one-piece structure; and
a second camera body having a contact surface which contacts one of an outer surface and an inner surface of the projection,
  wherein the projection is pressed on the contact surface of the second camera body and deformed elastically so as to bend in a direction approximately perpendicular to a direction in which the first camera body and the second camera body are assembled when the second camera body is coupled to the first camera body, and the contact surface and the projection are brought into contact with each other to form a waterproof region; and
  wherein the contact surface of the second camera body is formed such that when the first camera body and the second camera body are coupled to each other, a base of the projection is prevented from contacting the contact surface and an end portion thereof contacts the contact surface.

7. The waterproof structure according to claim 6, further comprising a clearance in which the elastically-deformed projection is allowed to be distorted, and
wherein the contact surface and the projection are brought into contact with each other to form a waterproof region.

8. The waterproof structure according to claim 7, wherein the contact surface and the clearance of the second camera body are each part of one of a concave portion and a groove.

9. The waterproof structure according to claim 6, further comprising a fixing mechanism for fixing the first camera body and the second camera body.

10. The waterproof structure according to claim 9, wherein the fixing mechanism comprises a plurality of screws.

11. A waterproof structure of a camera, comprising:
a first cover having an elastically-deformable projection;
a second cover having a groove at one end, the groove being fitted to the projection; and
a contact portion having an interference, which is wrapped with one wall surface of the groove, at an end portion of the projection,
  wherein a space, which is larger than the interference, is formed opposite to the contact portion and between the projection and another wall surface of the groove, and the contact portion of the projection is pressed on the one wall surface and the projection is distorted when the first cover and the second cover are coupled to each other.

12. The waterproof structure according to claim 11, wherein the contact portion is formed integrally with the projection as one component, and includes a small projection projected toward a wall surface of the groove which is opposed to the contact portion.

13. The waterproof structure according to claim 11, wherein the one wall surface of the groove includes:
a pressing surface for wrapping the interference near the contact portion; and
a space surface having a space for the projection near a base of the projection.

14. The waterproof structure according to claim 11, wherein the groove is formed such that an opening thereof is broader than a bottom thereof.

15. A waterproof structure obtained by coupling two covers constituted of one of metal and resin, the waterproof structure comprising:
a first cover having a projection formed integrally with a coupling portion as one component;
a second cover coupled to the first cover;
a groove formed in the second cover and fitted to the projection of the first cover; and
a small projection serving as a contact portion which extends from the projection toward one wall surface of the groove and has a height corresponding to an interference wrapped with the wall surface by a predetermined amount when the first cover and the second cover are coupled to each other,
  wherein a space, which is larger than the interference, is created on another wall surface of the groove and opposite to the small projection, and the small projection is pressed on the one wall surface and distorted in the space when the first cover and the second cover are coupled to each other.

16. The waterproof structure according to claim 15, which is applied to a waterproof camera.

17. A waterproof structure obtained by coupling at least two covers constituted of one of metal and resin, the waterproof structure comprising:
a first cover having a projection formed integrally with a coupling portion as one component;
a second cover coupled to the first cover;
a groove formed in the second cover and fitted to the projection of the first cover;
a small projection serving as a contact portion which extends from an end portion of the projection toward one wall surface of the groove, opposed to the projection, and has a height corresponding to an interference wrapped with the wall surface by a predetermined amount when the first cover and the second cover are coupled to each other;
a pressing surface formed on the one wall surface of the groove, for wrapping the interference with the contact portion; and
a space surface formed on the one wall surface of the groove, for creating a space at a base of the projection,
  wherein the small projection is pressed on the pressing surface and the projection is distorted when the first cover and the second cover are coupled to each other.

18. The waterproof structure according to claim 17, which is applied to a waterproof camera.

19. A waterproof structure comprising:
a first member having a coupling portion at one end, the coupling portion being formed integrally with the first member as a unitary one-piece structure;
a second member coupled to the first member;
a projection formed on the coupling portion and formed such that a distal end portion is thinner than a proximal portion; and
a groove formed in the second member and fitted to the projection,
wherein the projection is pressed on one wall surface of the groove and bent in a direction approximately perpendicular to a direction in which the first member and the second member are assembled when the first member and the second member are coupled to each other.

20. The waterproof structure according to claim 19, further comprising a guide portion provided at the projection, for allowing the projection to be easily fitted into the groove.

21. The waterproof structure according to claim 19, further comprising:
a contact surface formed on the one wall surface of the groove and contacting one of inner and outer surfaces of the projection at the distal end portion thereof; and
a clearance portion formed on the one wall surface of the groove and not contacting the proximal portion of the projection.

22. The waterproof structure according to claim 19, further comprising a space which is formed on another wall surface of the groove and which is larger than an amount of distortion of the projection when the first member and the second member are coupled to each other.

23. The waterproof structure according to claim 19, which is applied to a waterproof camera.

24. A waterproof structure comprising:
a first cover having a coupling portion at one end;
a second cover coupled to the first member;
a projection provided on the coupling portion and formed such that a distal end portion is thinner than a proximal portion;
a groove formed in the second member and fitted to the projection;
a contact surface having an interference provided at the projection, for wrapping the projection with one wall surface of the groove by a predetermined amount when the first cover and the second cover are coupled to each other;
a pressing surface formed on the one wall surface of the groove, for wrapping the interference with the contact surface; and
a space surface formed on the one wall surface of the groove, for creating a space at a base of the projection, wherein the projection is pressed on the pressing surface and distorted when the first cover and the second cover are coupled to each other.

25. The waterproof structure according to claim 24, wherein a space, which is larger than the interference, is provided between the projection and another wall surface of the groove which is opposed to the contact surface.

26. The waterproof structure according to claim 24, further comprising a position determining portion formed on an other wall surface of the groove, for determining a relative position of the first and second covers in a direction almost perpendicular to a coupling direction of the first and second covers at a base of the projection which is opposed to the contact surface.

27. The waterproof structure according to claim 24, which is applied to a waterproof camera.

* * * * *